United States Patent
Tsou

(10) Patent No.: US 10,345,951 B2
(45) Date of Patent: Jul. 9, 2019

(54) TOUCH PANEL AND SENSING METHOD THEREOF

(71) Applicant: AU OPTRONICS CORPORATION, Hsin-chu (TW)

(72) Inventor: Kun-Feng Tsou, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 35 days.

(21) Appl. No.: 15/388,847

(22) Filed: Dec. 22, 2016

(65) Prior Publication Data

US 2018/0011587 A1  Jan. 11, 2018

(30) Foreign Application Priority Data

Jul. 7, 2016 (TW) .............................. 105121659 A

(51) Int. Cl.
G06F 3/041 (2006.01)
G06F 3/044 (2006.01)

(52) U.S. Cl.
CPC ............ *G06F 3/0416* (2013.01); *G06F 3/044* (2013.01); *G06F 3/0418* (2013.01)

(58) Field of Classification Search
CPC .............................. G06F 3/044; G06F 3/0416
See application file for complete search history.

(56) References Cited

U.S. PATENT DOCUMENTS

| 2001/0052888 | A1  | 12/2001 | Hebiguchi |
| 2013/0215075 | A1* | 8/2013  | Lee ......................... G06F 3/044 |
|              |     |         | 345/174 |
| 2017/0046003 | A1* | 2/2017  | Huang .................. G06F 3/0418 |

FOREIGN PATENT DOCUMENTS

| CN | 103258492 A | 8/2013 |
| CN | 105093722 A | 11/2015 |
| TW | I383195 B1  | 1/2013 |

OTHER PUBLICATIONS

Office Action issued by the State Intellectual Property Office of the Peoples Republic of China dated Oct. 22, 2018 for Application No. CN201610790434.5.

* cited by examiner

*Primary Examiner* — Yuzhen Shen
(74) *Attorney, Agent, or Firm* — Tim Tingkang Xia, Esq.; Locke Lord LLP

(57) ABSTRACT

A touch panel and sensing method thereof include a first sensing pad group, a second sensing pad group and a first selection module. The first selection module includes a first selection terminal, a first input terminal, a first output terminal and a second output terminal. At a first time period, a first control signal is provided to the first selection terminal to conduct the first sensing pad group and a first driving signal terminal, and first sensing data of the first sensing pad group is determined. At a second time period, the first control signal is provided to the first selection terminal to conduct the second sensing pad group, and a first driving signal terminal and second sensing data is determined.

18 Claims, 5 Drawing Sheets

TOUCH PANEL AND SENSING METHOD THEREOF

CROSS-REFERENCE TO RELATED PATENT APPLICATION

This application claims the benefit of priority to Taiwan Patent Application No. 105121659, filed Jul. 7, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a touch panel and a sensing method thereof, and in particular, to a touch panel with a first selection module and a sensing method thereof.

BACKGROUND

Generally, in order to drive sensing pads by time and region, each sensing pad needs to be independently connected to a drive chip of a touch panel through a connection line, the drive chip of the touch panel provides a driving signal, and the driving signal is transmitted to the sensing pad through the connection line, so as to charge the sensing pad, thereby sensing a touch behavior of a user on the touch panel.

In order to enable each sensing pad to be connected to the drive chip of the touch panel, the drive chip of the touch panel needs to have enough contacts for the sensing pads to connect. Therefore, a size of the drive chip of the touch panel is increased, and in order to provide an enough quantity of contacts, internal wiring of the drive chip is very complex, resulting in a decrease in reliability of the drive chip and easy generation of coupling capacitance between lines, where the coupling capacitance causes noise at the connection lines.

SUMMARY

The present invention intends to provide a touch panel and a sensing method thereof, so as to reduce an amount of contacts provided by the touch panel to the sensing pads, and to decrease chance of noise generation at a connection line. In a sensing method of a touch panel disclosed in the present invention, a touch panel has a first sensing pad group, a second sensing pad group, and a first selection module. The first selection module has a first selection terminal, a first input terminal, a first output terminal, and a second output terminal. The first output terminal is electrically connected to the first sensing pad group, and the second output terminal is electrically connected to the second sensing pad group. The first input terminal is electrically connected to a first driving signal terminal. The sensing method of a touch panel includes: at a first time period, providing a first control signal to the first selection terminal to conduct the first sensing pad group and the first driving signal terminal, and determining first sensing data of the first sensing pad group, where a difference between a voltage of the first selection terminal and a voltage of the first input terminal is a first value; and at a second time period, providing the first control signal to the first selection signal terminal to at least conduct the second sensing pad group and the first driving signal terminal, and determining second sensing data, where the second sensing data is at least associated with the second sensing pad group, and a difference between a voltage of the first selection terminal and a voltage of the first input terminal is a second value.

A touch panel disclosed in the present invention has a first sensing pad group, a second sensing pad group, a first selection module, and a driving control circuit. The first selection module has a first selection terminal, a first input terminal, a first output terminal, and a second output terminal. The first output terminal is electrically connected to the first sensing pad group, and the second output terminal is electrically connected to the second sensing pad group. The driving control circuit has a first driving signal terminal and a first control terminal. The first driving signal terminal is electrically connected to the first input terminal. At a first time period, the driving control circuit at least provides a first control signal to the first selection terminal to conduct the first sensing pad group and the first driving signal terminal, and first sensing data of the first sensing pad group is determined. A difference between a voltage of the first selection terminal and a voltage of the first input terminal is a first value. At a second time period, the driving control circuit provides the first control signal to the first selection signal terminal to at least conduct the second sensing pad group and the first driving signal terminal, and second sensing data is determined. The second sensing data is at least associated with the second sensing pad group. A difference between a voltage of the first selection terminal and a voltage of the first input terminal is a second value.

According to the foregoing touch panel and the sensing method thereof disclosed in the present invention, the first selection module is electrically connected between the sensing pad group and the driving control circuit, so as to reduce a quantity of contacts of the driving control circuit for connecting sensing pads, thereby further reducing a size of the driving control circuit. Further, a difference between a voltage of a control terminal and a voltage of a input terminal of the first selection module is controlled at a value, so as to prevent coupling capacitance from being generated between the control terminal and the input terminal of the first selection module, thereby preventing noise from being generated at connection lines of the sensing pads.

The foregoing description of the disclosure and the following description of implementation manners are intended to demonstrate and explain the spirit and principle of the present invention and to provide further explanations of the claims of the present invention.

DETAILED DESCRIPTION

Specific features and advantages of the present invention are described in detail in the implementation manners below, and content of the specific features and advantages is sufficient for a person skilled in the art to understand the technical content of the present invention and to carry out implementation on the basis thereof. Moreover, according to the disclosure of the description, the claims, and the drawings, a person skilled in the art can easily understand related objectives and advantages of the present invention. The embodiments below are intended to further describe the perspectives of the present invention in detail, but are not intended to use any perspective to limit the scope of the present invention.

Figure 1:
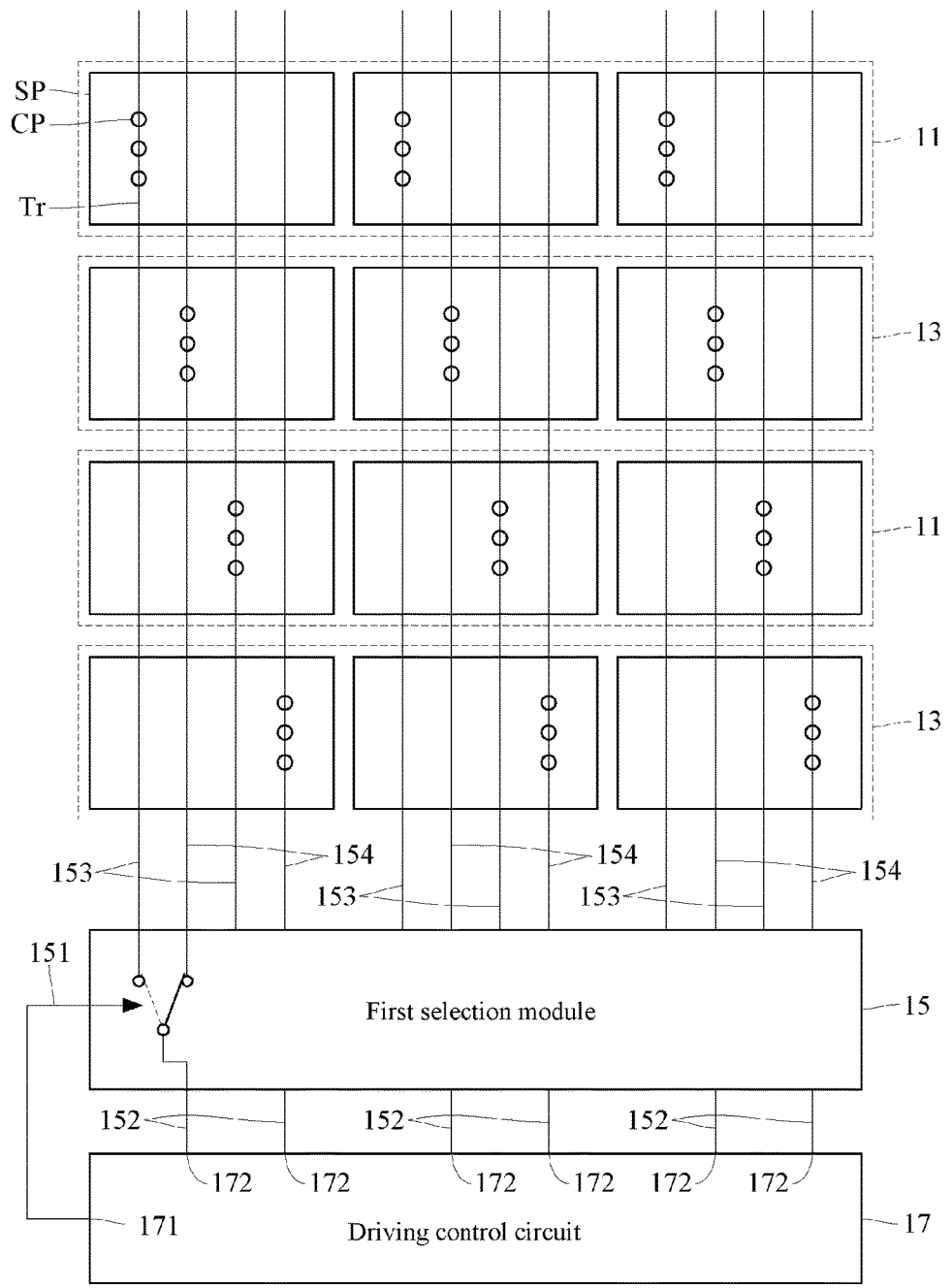
FIG. 1 is a schematic diagram of a touch panel according to an embodiment of the present invention.
Figure 2:
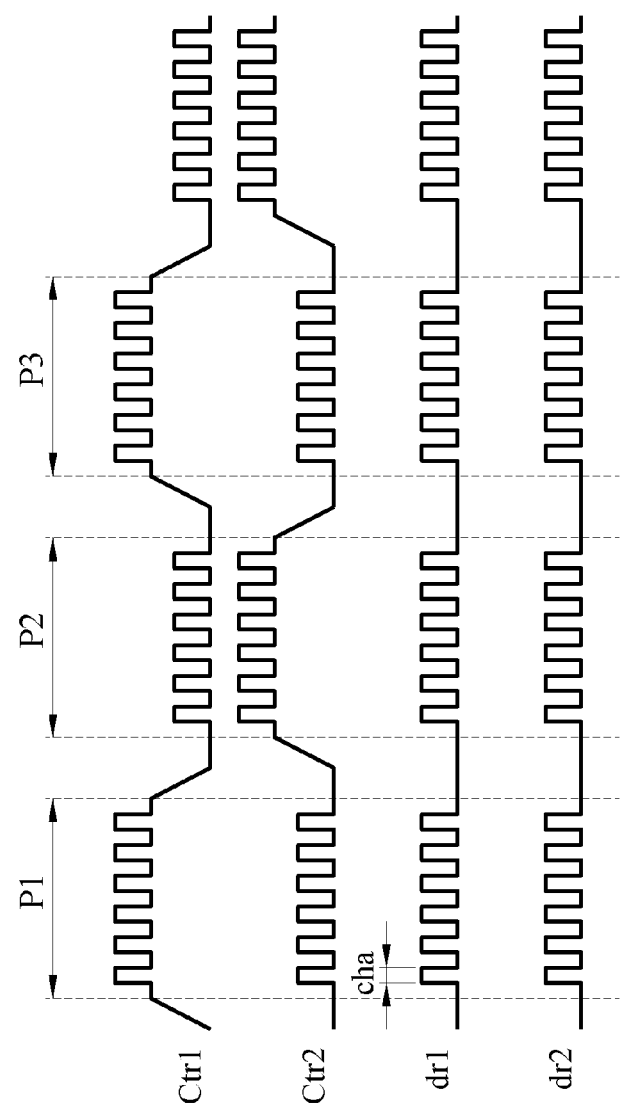
FIG. 2 is a voltage timing diagram of a touch panel according to another embodiment of the present invention.

Referring to FIG. 1 and FIG. 2, FIG. 1 is a schematic diagram of a touch panel according to an embodiment of the present invention, and FIG. 2 is a voltage timing diagram of a touch panel according to another embodiment of the present invention. As shown in the figures, a touch panel 10 has first sensing pad groups 11, second sensing pad groups 13, a first selection module 15, and a driving control circuit 17. Each of the first sensing pad groups 11 and the second sensing pad groups 13 have a plurality of sensing pads SP. The sensing pads SP are arranged as a sensing array. Each sensing pad SP is connected to a connection line Tr by means of connection pads CP, and the sensing pad SP is electrically connected to the first selection module 15 and the driving control circuit 17 through the connection line Tr. In the embodiments shown in the figures, a first row and a third row of sensing pads SP in the sensing array are defined as the first sensing pad groups 11, and a second row and a fourth row of sensing pads SP are defined as the second sensing pad groups 13, but the present invention is not limited thereto.

The first selection module 15 has a first selection terminal 151, a plurality of first input terminals 152, a plurality of first output terminals 153, and a plurality of second output terminals 154. One first output terminal 153 is electrically connected to one sensing pad SP defined as the first sensing pad group, one second output terminal 154 is electrically connected to one sensing pad SP defined as the second sensing pad group. In other words, each sensing pad SP at the first row and the third row is connected to one first output terminal 153 of the first selection module 15, and each sensing pad SP at the second row and the fourth row is connected to one second output terminal 154 of the first selection module 15. The first selection module 15 selectively outputs, according to a signal on the first selection terminal 151, signals on the first input terminals 152 via the first output terminals 153 or the second output terminals 154. In other words, the first selection module 15 selectively conduct the first input terminals 152 and the first output terminals 153 or conduct the first input terminals 152 and the second output terminals 154 according to the signal on the first selection terminal 151.

The driving control circuit 17 has a first control terminal 171 and a plurality of first driving signal terminals 172. The first driving signal terminals 172 are electrically connected to the first input terminals 152 of the first selection module 15. The first control terminal 171 is electrically connected to the first selection terminal 151 of the first selection module 15.

In the first embodiment, the driving control circuit 17 intermittently uses a first driving signal dr1 to charge a sensing pad SP, and determines, at a time period that the sensing pad SP is not charged, first sensing data of the sensing pad SP according to a signal responded by the sensing pad SP from a first driving signal terminal 172. The first sensing data is associated with a touch behavior of a user on the sensing pad SP.

As shown in FIG. 2, at a first time period P1, a difference between a voltage of the first selection terminal 151 and a voltage of each first input terminal 152 is a first value. In other words, a first control signal Ctr1 on the first selection terminal 151 and a first driving signal dr1 on each first input terminal 152 have identical waveform changes, that is, in order to charge and discharge a sensing pad SP at a first column and a first row intermittently, when the first driving signal dr1 has an intermittent waveform change, the first control signal Ctr1 also has a waveform change the same as that of the first driving signal dr1, so as to enable a difference between the voltage of the first selection terminal 151 and the voltage of the first input terminal 152 to maintain at a value.

It should be understood by a person of ordinary skill in the art that the difference between the voltages being maintained at the value also includes a small change of the difference between the voltages above and below the value. In practice, the difference between the voltage of the first selection terminal 151 and the voltage of each first input terminal 152 may change due to a factor of another element in the touch panel or a signal, and therefore, it is difficult to maintain the difference between the voltages at a value. These changes of the difference between the voltages shall fall within the scope that the difference between the voltage of the first selection terminal 151 and the voltage of each first input terminal 152 is the first value in this embodiment.

Subsequently, at a second time period P2, the driving control circuit 17 provides the first control signal Ctr1 to the first selection signal terminal 151 from the first control terminal 171, so as to enable the first selection module 15 to conduct the second sensing pad groups 13 and the first driving signal terminals 172, thereby conducting the second sensing pad groups 13 and the first driving signal terminals 172. Likewise, for the sensing pad SP at the first column and the first row and a sensing pad SP at the first column and a second row, at the second time period P2, a first driving signal terminal 172 provides the first driving signal dr1 to the sensing pad SP at the first column and the second row, and determines second sensing data. The second sensing data is at least associated with the sensing pad SP at the first column and the second row.

Likewise, in one embodiment, a driving control circuit 17 intermittently uses a first driving signal dr1 to charge a sensing pad SP at a first column and a second row, and determines, at a time period that the sensing pad SP is not charged, second sensing data of the sensing pad SP according to a signal responded by the sensing pad SP from a first driving signal terminal 172. The second sensing data is also associated with a touch behavior of a user on the sensing pad SP at the first column and the second row.

At the second time period P2, a difference between a voltage of the first selection terminal 151 and each first input terminal 152 is a second value. In this embodiment, whether the second value is equal to the difference between the voltage of the first selection terminal 151 and the voltage of each first input terminal 152 at the first time period P1 or not is not limited.

Figure 3:
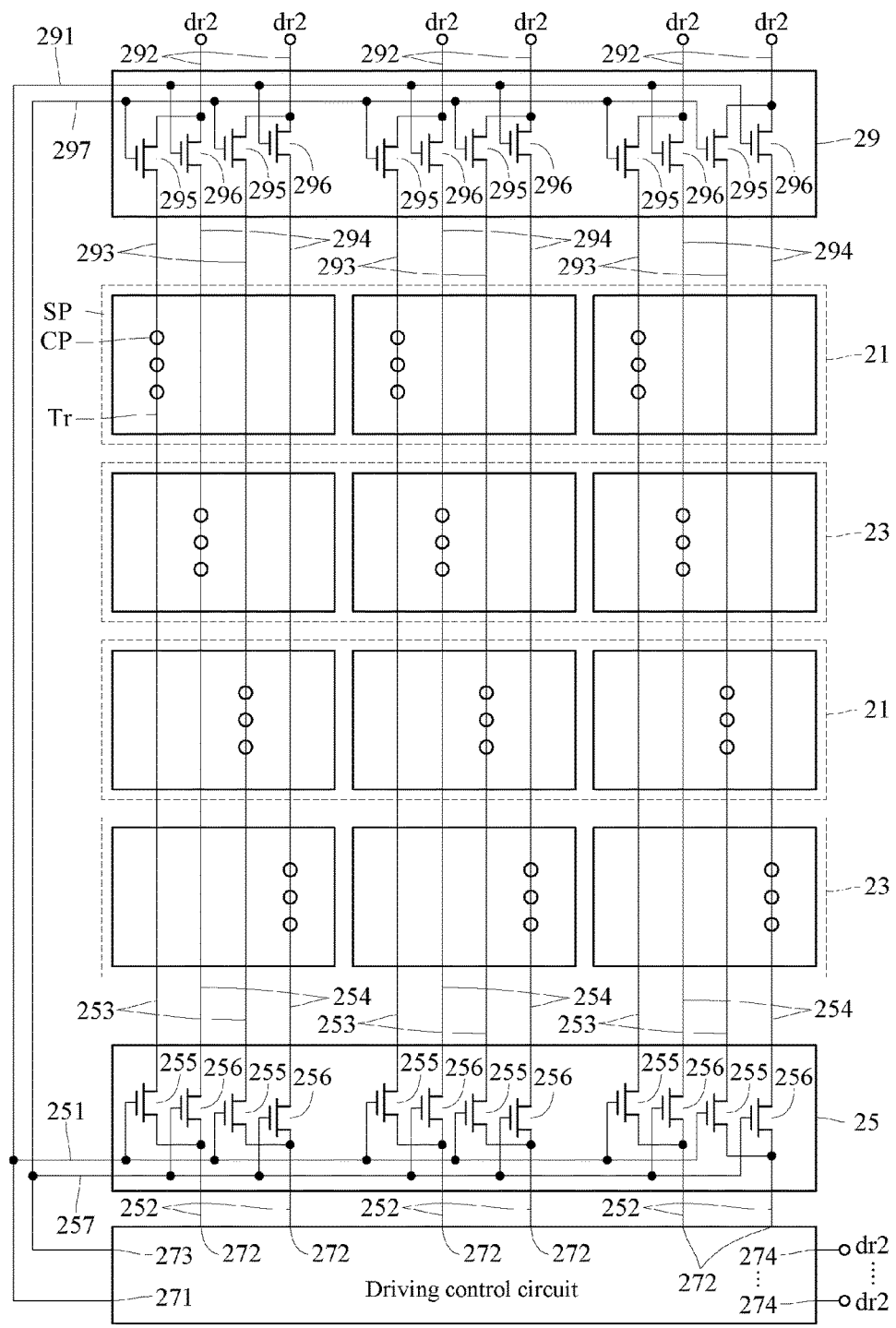
FIG. 3 is a schematic diagram of a touch panel according to still another embodiment of the present invention.

Referring to FIG. 3, FIG. 3 is a schematic diagram of a touch panel according to still another embodiment of the present invention. As shown in the FIG. 3, a touch panel 20 has first sensing pad group 21, second sensing pad groups 23, a first selection module 25, a driving control circuit 27, and a second selection module 29.

The first selection module 25 has a first selection terminal 251, a plurality of first input terminals 252, a plurality of first output terminals 253, and a plurality of second output terminals 254, and each the first sensing pad groups 21 and the second sensing pad groups 23 has a plurality of sensing pads SP. The same as the foregoing embodiment, the sensing pads SP are arranged as a sensing array. Each sensing pad SP is connected to a connection line Tr by means of connection pads CP, and the sensing pad SP is electrically connected to the first selection module 25, the driving control circuit 27, and the second selection module 29 through the connection line Tr. In the embodiment shown in the figure, a first row and a third row of sensing pads SP in the sensing array are defined as the first sensing pad groups 21, and a second row and a fourth row of sensing pads SP are defined as the second sensing pad groups 23, but the present invention is not limited thereto. First switches 255, a plurality of second switches 256, and a third selection terminal 257 are provided. One first output terminal 253 is electrically connected to one sensing pad SP defined in the first sensing pad groups 21, one second output terminal 254 is electrically connected to one sensing pad SP defined in the second sensing pad groups 23. In the embodiment of the figure, for a sensing pad SP at a first column and a first row and a sensing pad SP at the first column and a second row, the sensing pad SP at the first column and the first row is electrically connected to one first output terminal 253 of the first selection module 25, and the sensing pad SP at the first column and the second row is electrically connected to one second output terminal 254 of the first selection module 25.

Each of the first switches 255 and the second switches 256 of the first selection module 25 has a first terminal, a second terminal, and a control terminal. A first terminal of a first switch 255 is electrically connected to a first output terminal 253, and is further electrically connected to a sensing pad SP in the first sensing pad groups 21. A second terminal of the first switch 255 is electrically connected to a first input terminal 252. A control terminal of the first switch 255 is electrically connected to the first selection terminal 251. A first terminal of a second switch 256 is electrically connected to a second output terminal 254, and is further electrically connected to a sensing pad SP in the second sensing pad groups 23. A second terminal of the second switch 256 is electrically connected to a first input terminal 252. A control terminal of the second switch 256 is electrically connected to the third selection terminal 257.

The first switch 255 is selectively conducted according to a signal on the first selection terminal 251, so as to conduct the first input terminal 252 and the first output terminal 253. The second switch 256 is selectively conducted according to a signal on the third selection terminal 257, so as to conduct the first input terminal 252 and the second output terminal 254.

The second selection module 29 has a second selection terminal 291, a plurality of second input terminals 292, a plurality of third output terminals 293, a plurality of fourth output terminals 294, a plurality of third switches 295, a plurality of fourth switches 296, and a fourth selection terminal 297. One third output terminal 293 is electrically connected to one sensing pad SP defined in the first sensing pad groups 21, one fourth output terminal 294 is electrically connected to one sensing pad SP defined in the second sensing pad groups 23. In other words, two ends of each connection line Tr for connecting one of the first row or the third row of sensing pads SP are separately connected to a first output terminal 253 of the first selection module 25 and a third output terminal 293 of the second selection module 29. Two ends of each connection line Tr for connecting one of the second row or the fourth row of sensing pads SP are separately connected to a second output terminal 254 of the first selection module 25 and a fourth output terminal 294 of the second selection module 29.

Each of the third switches 295 and the fourth switches 296 of the second selection module 29 has a first terminal, a second terminal, and a control terminal. A first terminal of a third switch 295 is electrically connected to a third output terminal 293, and is further electrically connected to a sensing pad SP in the first sensing pad groups 21. A second terminal of the third switch 295 is electrically connected to a second input terminal 292. A control terminal of the third switch 295 is electrically connected to the fourth selection terminal 297. A first terminal of a fourth switch 296 is electrically connected to a fourth output terminal 294, and is further electrically connected to a sensing pad SP in the second sensing pad groups 23. A second terminal of the fourth switch 296 is electrically connected to a second input terminal 292. A control terminal of the fourth switch 296 is electrically connected to the second selection terminal 291.

The third switch 295 is selectively conducted according to a signal on the fourth selection terminal 297, so as to conduct the second input terminal 292 and the third output terminal 293. The fourth switch 296 is selectively conducted according to a signal on the second selection terminal 291, so as to conduct the second input terminal 292 and the fourth output terminal 294.

The driving control circuit 27 has a first control terminal 271, a plurality of first driving signal terminals 272, a second control terminal 273, and a plurality of second driving signal terminals 274. The first control terminal 271 is electrically connected to the first selection terminal 251 of the first selection module 25 and the second selection terminal 291 of the second selection module 29. The first driving signal terminals 272 are electrically connected to the first input terminals 252 of the first selection module 25. The second control terminal 273 is electrically connected to the third selection terminal 257 of the first selection module 25 and the fourth selection terminal 297 of the second selection module 29. The second driving signal terminals 274 are electrically connected to the second input terminals 292 of the second selection module 29.

To facilitate the description, a first switch 255, a second switch 256, a third switch 295, and a fourth switch 296 connected to the sensing pad SP at the first column and the first row and the sensing pad SP at the first column and the second row are used as examples for description below, and a person of ordinary skill in the art shall understand implementation manners related to other switches and signals according to the examples of the sensing pad SP at the first column and the first row and the sensing pad SP at the first column and the second row.

Referring to FIG. 2 and FIG. 3, as shown in the figures, at the first time period P1, the driving control circuit 27 outputs, from the first control terminal 271, a first control signal Ctr1 of a high voltage level to the first selection terminal 251 and the second selection terminal 291, and outputs, from the second control terminal 273, a second control signal Ctr2 of a low voltage level to the third selection terminal 257 and the fourth selection terminal 297.

The first switch 255 and the fourth switch 296 are conducted according to the first control signal Ctr1. The second switch 256 and the third switch 295 are not conducted according to the second control signal Ctr2.

A first driving signal dr1 output by a first driving signal terminal 272 is provided to the sensing pad SP at the first column and the first row through the first switch 255, and a second driving signal dr2 output by a second driving signal terminal 274 is provided to the sensing pad SP at the first column and the second row through the fourth switch 296. The sensing pad SP at the first column and the first row is intermittently charged according to the first driving signal dr1, and the driving control circuit 27 senses, at a non-charging period between two charging periods cha, a signal on the sensing pad SP at the first column and the first row and determines first sensing data according to the signal on the sensing pad SP at the first column and the first row.

The sensing pad SP at the first column and the second row is also intermittently charged by a second driving signal dr2 and the first driving signal dr1 provided to the sensing pad SP at the first column and the second row. However, at the first time period, the driving control circuit 27 does not sense a signal on the sensing pad SP at the first column and the second row. The signal on the sensing pad SP at the first column and the second row is the same as the signal on the sensing pad SP at the first column and the first row, such that mutual capacitance generated between the sensing pad SP at the first column and the second row and the sensing pad SP at the first column and the first row can be reduced, and accuracy of the first sensing data is improved. In one embodiment, a first driving signal dr1 and a second driving signal dr2 are signals of a same phase and a same voltage.

Viewing from the first switch 255 and the fourth switch 296, a second terminal of the first switch 255 is provided with the first driving signal dr1, a control terminal of the first switch 255 is provided with the first control signal Ctr1, and the first control signal Ctr1 and the first driving signal dr1 have a same waveform change, so as to enable a difference between voltages of the second terminal and the control terminal of the first switch 255 to be a first value. The conduction of the control terminal of the first switch 255 is not affected by a change of voltages for charging and discharging of the first driving signal dr1. On the contrary, when the first control signal Ctr1 on the control terminal of the first switch 255 does not change with the change of the voltages for charging and discharging of the first driving signal dr1, the difference between the voltages of the control terminal and the second terminal of the first switch 255 fail to maintain at a value. At the period that the first driving signal dr1 charges the sensing pad SP, the difference between the voltages of the control terminal and the second terminal maintains at a value for conducting the first switch 255. However, at the non-charging period that the driving control circuit 27 determines the second sensing data of the sensing pad SP, the voltage level of the first driving signal dr1 decreases, the control terminal of the first switch 255 is subjected to capacitive coupling between the control terminal and the second terminal and therefore is pulled to a low voltage level, and consequently, a conduction capability of the first switch 255 is affected, and detection of the signal on the sensing pad SP by the driving control circuit 27 may be further affected, causing that the first sensing data cannot be accurately determined. In other words, when the first control signal Ctr1 on the control terminal of the first switch 255 changes with the change of the voltages for charging and discharging of the first driving signal dr1, the difference between the voltages of the control terminal and the second terminal of the first switch 255 maintains at the value, which ensures the conduction of the first switch 255, and prevents coupling capacitance from being generated between the control terminal and the second terminal of the first switch 255 and therefore further prevent noise from being generated at the connection line Tr.

Likewise, the first control signal Ctr1 provided to the control terminal of the fourth switch 296 and the second driving signal dr2 provided to the second terminal also have a same waveform change, so as to enable a difference between a voltage of the second terminal and a voltage of the control terminal of the fourth switch 296 to be a value. In this way, the conduction of the control terminal of the fourth switch 296 is not affected by a change of voltages for charging and discharging of the first driving signal dr1, and coupling capacitance is not generated between the control terminal and the second terminal of the fourth switch 296 and therefore noise is not generated at a connection line Tr.

On the other hand, control terminals of the second switch 256 and the third switch 295 are not conducted according to the second control signal Ctr2 of the low voltage level. Although the second switch 256 is not conducted at the first time period P1, the first driving signal dr1 is still provided to the second terminal of the second switch 256. The same as the first switch 255, when the signal on the control terminal of the second switch 256 does not change with the signal on the second terminal, the control terminal of the second switch 256 is subjected to capacitive coupling between the control terminal and the second terminal, causing that the second switch 256 is conducted at the first time period P1. In other words, the signal on the control terminal of the second switch 256 changing with the signal on the second terminal may enable the second switch 256 to be not conducted at the first time period P1, and prevent capacitance from being generated between the control terminal and the second terminal and therefore prevent the capacitance from affecting a signal on the connection line Tr. Likewise, the second control signal Ctr2 provided to the control terminal of the third switch 295 and the second driving signal dr2 have a same waveform change, so as to enable the third switch 295 to be not conducted at the first time period P1, and further prevent capacitance from being generated between the control terminal and the second terminal of the third switch 295 and therefore prevent the capacitance from affecting a signal on the connection line Tr.

Subsequently, at the second time period P2, the driving control circuit 27 outputs, from the first control terminal 271, the first control signal Ctr1 of the low voltage level to the first selection terminal 251 and the second selection terminal 291, and outputs, from the second control terminal 273, the second control signal Ctr2 of the high voltage level to the third selection terminal 257 and the fourth selection terminal 297. The first switch 255 and the fourth switch 296 are not conducted according to the first control signal Ctr1. The second switch 256 and the third switch 295 are conducted according to the second control signal Ctr2.

The first driving signal dr1 output by the first driving signal terminal 272 is provided to the sensing pad SP at the first column and the second row through the second switch 256, and the second driving signal dr2 output by the second driving signal terminal 274 is provided to the sensing pad SP at the first column and the first row through the third switch 295. The sensing pad SP at the first column and the second row is intermittently charged according to the first driving signal dr1, and the driving control circuit 27 senses, at a non-charging period between two charging periods cha, a signal on the sensing pad SP at the first column and the second row and determines second sensing data according to the signal on the sensing pad SP at the first column and the second row.

The sensing pad SP at the first column and the first row is also intermittently charged by the second driving signal dr2 and the first driving signal dr1 provided to the sensing pad SP at the first column and the first row. However, at the second time period, the driving control circuit 27 does not sense the signal on the sensing pad SP at the first column and the first row. The signal on the sensing pad SP at the first column and the first row is the same as the signal on the sensing pad SP at the first column and the second row, such that mutual capacitance generated between the sensing pad SP at the first column and the second row and the sensing pad SP at the first column and the first row can be reduced, and accuracy of the second sensing data is improved.

Viewing from the second switch 256 and the third switch 295, a second terminal of the second switch 256 is provided with the first driving signal dr1, a control terminal of the second switch 256 is provided with the second control signal Ctr2, and the second control signal Ctr2 and the first driving signal dr1 have a same waveform change, so as to enable a difference between the voltages of the second terminal and the control terminal of the second switch 256 to be a second value. The conduction of the control terminal of the second switch 256 is not affected by a change of voltages for charging and discharging of the first driving signal dr1. More specifically, when the second control signal Ctr2 on the control terminal of the second switch 256 does not change with a change of the voltages for charging and discharging of the first driving signal dr1, the difference between the voltages of the control terminal and the second terminal of the second switch 256 fail to maintain at a value. At the period that the first driving signal dr1 charges the sensing pad SP, the difference between the voltages of the control terminal and the second terminal maintains at a value for conducting the second switch 256. However, at the non-charging period that the driving control circuit 27 determines the second sensing data of the sensing pad SP, the voltage level of the first driving signal dr1 decreases, the control terminal of the second switch 256 is subjected to capacitive coupling between the control terminal and the second terminal and therefore is pulled to a low voltage level, and consequently, a conduction capability of the second switch 256 is affected, and detection of the signal on the sensing pad SP by the driving control circuit 27 may be further affected, causing that the second sensing data cannot be accurately determined. In other words, when the second control signal Ctr2 on the control terminal of the second switch 256 changes with the change of the voltages for charging and discharging of the first driving signal dr1, the difference between the voltages of the control terminal and the second terminal of the second switch 256 maintains at the value, which ensures the conduction of the second switch 256, and prevents coupling capacitance from being generated between the control terminal and the second terminal of the second switch 256 and therefore further prevent noise from being generated at the connection line Tr.

Likewise, the second control signal Ctr2 provided to the control terminal of the third switch 295 and the second driving signal dr2 provided to the second terminal also have a same waveform change, so as to enable a difference between voltages of the second terminal and the control terminal of the third switch 295 to be a value. In this way, the conduction of the control terminal of the third switch 295 is not affected by a change of voltages for charging and discharging of the first driving signal dr1, and coupling capacitance is not generated between the control terminal and the second terminal of the third switch 295 and therefore noise is not generated at a connection line Tr.

According to another aspect, control terminals of the first switch 255 and the fourth switch 296 are not conducted according to the first control signal Ctr1 of the low voltage level. Although the first switch 255 is not conducted at the first time period P1, the first driving signal dr1 is still provided to the second terminal of the first switch 255. The same as the second switch 256, when the signal on the control terminal of the first switch 255 does not change with the signal on the second terminal, the control terminal of the first switch 255 is subjected to capacitive coupling between the control terminal and the second terminal, causing that the first switch 255 is conducted at the second time period P2. In other words, the signal on the control terminal of the first switch 255 changing with the signal on the second terminal may enable the first switch 255 to be not conducted at the second time period P2, and prevent capacitance from being generated between the control terminal and the second terminal and therefore prevent the capacitance from affecting the signal on the connection line Tr. Likewise, the first control signal Ctr1 provided to the control terminal of the fourth switch 296 and the second driving signal dr2 have a same waveform change, so as to enable the fourth switch 296 to be not conducted at the second time period P2, and further prevent capacitance from being generated between the control terminal and the second terminal of the fourth switch 296 and therefore prevent the capacitance from affecting the signal on the connection line Tr.

In this embodiment, at the first time period P1, the driving control circuit 27 determines the first sensing data of the first sensing pad groups 21, and at the second time period P2, the driving control circuit 27 determines the second sensing data of the second sensing pad groups 23. In other words, with continuous switchover between the first time period P1 and the second time period P2, the driving control circuit 27 can determine the sensing data of all the sensing pads SP, and further determine a touch position of a user on the panel according to the signals on the sensing pads SP, for example, capacitance values, voltage values, or other appropriate values. In one embodiment, a driving control circuit 27 may sequentially acquire a signal on a sensing pad SP from a first driving signal dr1 output from a first driving signal terminal 272. In other words, this embodiment does not limit that the driving control circuit 27 needs to synchronously output the first driving signal dr1 from all the first driving signal terminals 272. Besides, the driving control circuit 27 may coordinately output a second driving signal dr2 from a second driving signal terminal 274 according to a first driving signal terminal 272 that outputs a first driving signal dr1, which may be designed by a person of ordinary skill in the art according to actual requirements, and details are not described herein. In the foregoing embodiment, the control terminals of the first switch 255 and the fourth switch 296 are provided with the same first control signal Ctr1, and the control terminals of the second switch 256 and the third switch 295 are provided with the same second control signal Ctr2. In another embodiment, control terminals of a first switch 255 and a fourth switch 296 may be provided with different control signals, so as to conduct the first switch 255 and the fourth switch 296. Control terminals of a second switch 256 and a third switch 295 may also be provided with different control signals, so as to conduct the second switch 256 and the third switch 295. When the control terminals of the first switch 255 and the fourth switch 296 are provided with different control signals, a difference between voltages of the control terminal and a second terminal of the first switch 255 may be not equal to a difference between voltages of the control terminal and a second terminal of the fourth switch 296, which is not limited in this embodiment. Likewise, when the control terminals of the second switch 256 and the third switch 295 are provided with different control signals, a difference between voltages of the control terminal and a second terminal of the second switch 256 may be not equal to a difference between voltages of the control terminal and a second terminal of the third switch 295.

When a difference between voltages of a second terminal and a control terminal of each of the first switch 255, the second switch 256, the third switch 295, and the fourth switch 296 is a value, a difference between voltages of the first selection terminal 251 and each first input terminal 252 of the first selection module 25 is the value, and a difference between voltages of the third selection terminal 257 and each first input terminal 252 is the value. A difference between voltages of the second selection terminal 291 and each second input terminal 292 of the second selection module 29 is the value, and a difference between voltages of the fourth selection terminal 297 and each second input terminal 292 is the value. It should be understood by a person of ordinary skill in the art that the difference between the voltages being maintained at the value also includes a small change of the difference between the voltages above and below the value. In practice, a difference between voltages may change due to a factor of another element in the touch panel, a signal, or other factors, and therefore, it is difficult to maintain the difference between the voltages at a value, and the changes of the difference between the voltages shall fall within the scope of this embodiment.

Figure 4:
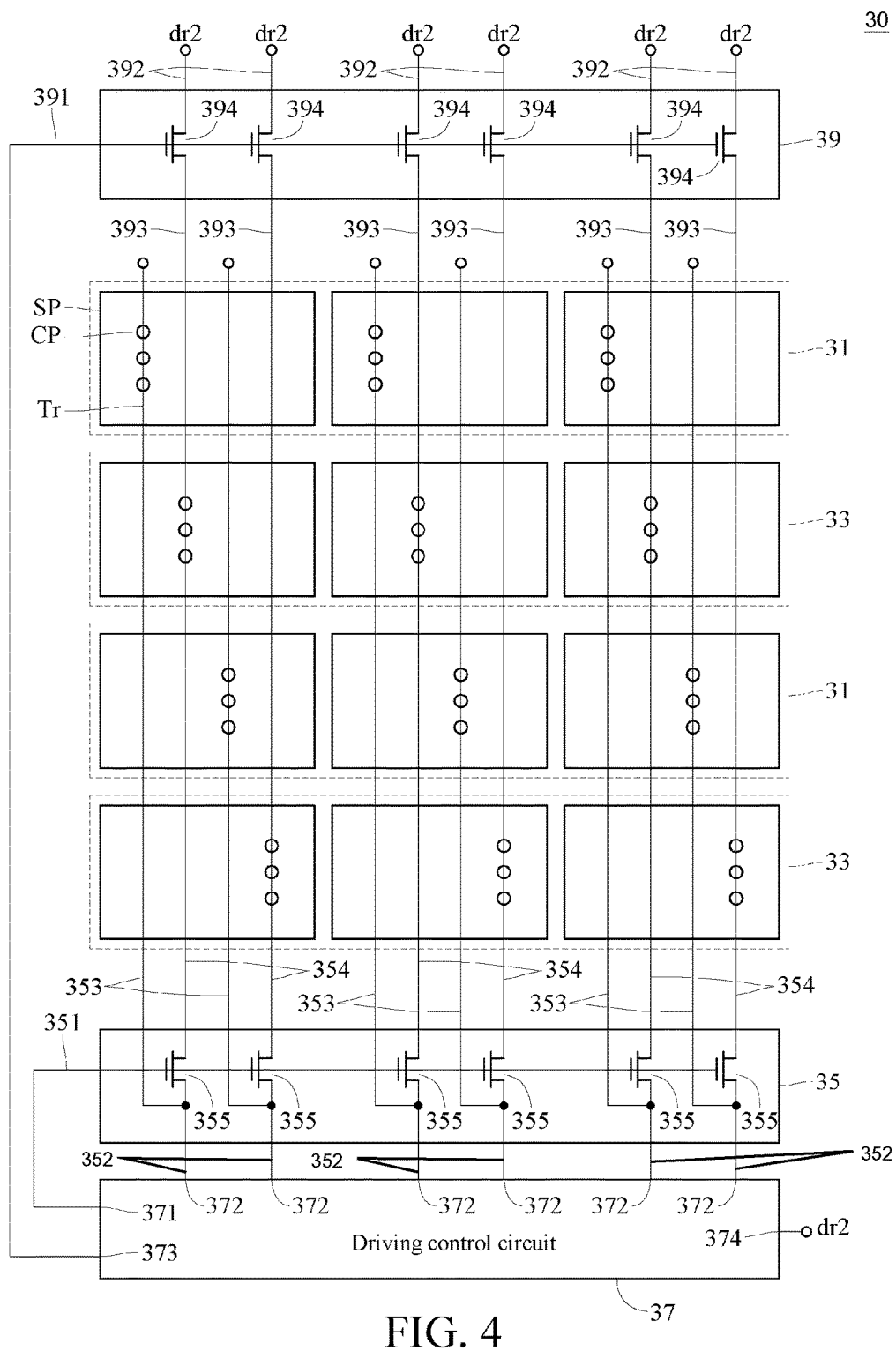
FIG. 4 is a schematic diagram of a touch panel according to yet another embodiment of the present invention.
Figure 5:
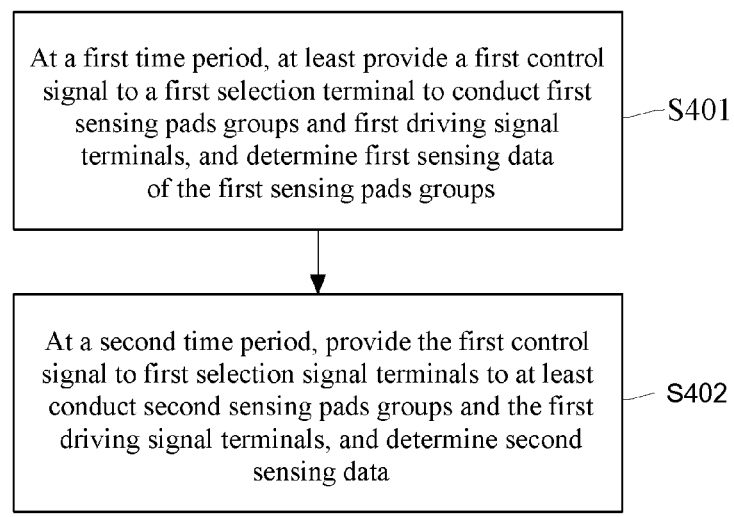
FIG. 5 is a flowchart of steps of a sensing method of a touch panel according to an embodiment of the present invention.

Referring to FIG. 4, FIG. 4 is a schematic diagram of a touch panel according to yet another embodiment of the present invention. As shown in the FIG. 4, a touch panel 30 has first sensing pad groups 31, second sensing pad groups 33, a first selection module 35, a driving control circuit 37, and a second selection module 39. Each of the first sensing pad groups 31 and the second sensing pad groups 33 has a plurality of sensing pads SP. The same as the foregoing embodiment, the sensing pads SP are arranged as a sensing array. Each sensing pad SP is connected to a connection line Tr through connection pads CP, and the sensing pad SP is electrically connected to the first selection module 35, the driving control circuit 37, and the second selection module 39 through the connection line Tr. In the embodiment shown in the figure, a first row and a third row of sensing pads SP in the sensing array are defined as the first sensing pad groups 31, and a second row and a fourth row of sensing pads SP are defined as the second sensing pad groups 33, but the present invention is not limited thereto.

The first selection module 35 has a first selection terminal 351, a plurality of first input terminals 352, a plurality of first output terminals 353, a plurality of second output terminals 354, and a plurality of first switches 355. One first output terminal 353 is electrically connected to one sensing pad SP defined in the first sensing pad groups 31, one second output terminal 354 is electrically connected to one sensing pad SP defined in the second sensing pad groups 33. In the embodiment of the figure, for a sensing pad SP at a first column and a first row and a sensing pad SP at the first column and a second row, the sensing pad SP at the first column and the first row is electrically connected to one first output terminal 353 of the first selection module 35, and the sensing pad SP at the first column and the second row is electrically connected to one second output terminal 354 of the first selection module 35.

Each first output terminal 353 of the first selection module 35 is electrically connected to one first input terminal 352. Each of the first switches 355 of the first selection module 35 has a first terminal, a second terminal, and a control terminal. A first terminal of a first switch 355 is electrically connected to a second output terminal 354, and is further electrically connected to a sensing pad SP in the second sensing pad groups 33. A second terminal of the first switch 355 is electrically connected to a first input terminal 352. The first switch 355 is selectively conducted according to a signal on the first selection terminal 351, so as to conduct the first input terminal 352 and the first output terminal 354.

The second selection module 39 has a second selection terminal 391, a plurality of second input terminals 392, a plurality of third output terminals 393, and a plurality of second switches 394. A third output terminal 393 is electrically connected to a sensing pad SP defined in the second sensing pad groups 33. In other words, each connection line Tr for connecting one of the first row or the third row of the sensing pads SP is connected to a first output terminal 353 of the first selection module 35. Two ends of each connection line Tr for connecting one of the second row or the fourth row of sensing pads SP are separately connected to a second output terminal 354 of the first selection module 35 and a third output terminal 393 of the second selection module 39.

Each of the second switches 394 of the second selection module 39 has a first terminal, a second terminal, and a control terminal. A first terminal of a second switch 394 is electrically connected to a third output terminal 393, and is further electrically connected to a sensing pad SP in the second sensing pad groups 33. A second terminal of the second switch 394 is electrically connected to a second input terminal 392. A control terminal of the second switch 394 is electrically connected to the second selection terminal 391. The second switch 394 is selectively conducted according to a signal on the second selection terminal 391, so as to conduct the second input terminal 392 and the third output terminal 393.

The driving control circuit 37 has a first control terminal 371, a plurality of first driving signal terminals 372, a second control terminal 373, and a plurality of second driving signal terminals 374. The first control terminal 371 is electrically connected to the first selection terminal 351 of the first selection module 35. The first driving signal terminals 372 are electrically connected to the first input terminals 352 of the first selection module 35. The second control terminal 373 is electrically connected to the second selection terminal 391 of the second selection module 39. The second driving signal terminals 374 are electrically connected to the second input terminals 392 of the second selection module 39.

To facilitate the description, the sensing pad SP at the first column and the first row and the sensing pad SP at the first column and the second row are used as examples for description below, and a person of ordinary skill in the art shall understand implementation manners related to other switches and signals according to the examples of the sensing pad SP at the first column and the first row and the sensing pad SP at the first column and the second row. Besides, a voltage timing diagram of this embodiment is approximately the same as the voltage timing diagram of the embodiment of FIG. 2, and therefore, description is made with reference to the timing diagram shown in FIG. 2 and FIG. 4 below. Moreover, in order to correspond to the text of the claims, the description below is made by using the second time period P2 and a third time period P3. In correspondence with the foregoing embodiment, first, the second time period P2 is described first, and second, the first time period is described. In practice, switchover between the first time period P1 and the second time period is carried out continuously, and therefore, whether to perform operations at the first time period P1 first or to perform operations at the second time period P2 first by the touch panel involves no difference in this embodiment.

As shown in the figures, at the second time period P2, the driving control circuit 37 outputs, from the first control terminal 371, a first control signal Ctr1 of a low voltage level to the first selection terminal 351, and outputs, from the second control terminal 373, a second control signal Ctr2 of a high voltage level to the second selection terminal 391. The first switch 355 is not conducted according to the first control signal Ctr1, and the second switch 394 is conducted according to the second control signal Ctr2.

A first driving signal dr1 output by a first driving signal terminal 372 is provided to the sensing pad SP at the first column and the first row through a first output terminal 353, and a second driving signal dr2 output by a second driving signal terminal 374 is provided to the sensing pad SP at the first column and the second row through the second switch 394. The sensing pad SP at the first column and the first row is intermittently charged according to the first driving signal dr1, and the driving control circuit 37 senses, at a non-charging period between two charging periods cha, a signal on the sensing pad SP at the first column and the first row and determines first sensing data according to the signal on the sensing pad SP at the first column and the first row.

The sensing pad SP at the first column and the second row is also intermittently charged by a second driving signal dr2 and the first driving signal dr1 provided to the sensing pad SP at the first column and the second row. However, at the second time period P2, the driving control circuit 37 does not sense a signal on the sensing pad SP at the first column and the second row. The signal on the sensing pad SP at the first column and the first row is the same as the signal on the sensing pad SP at the first column and the second row, such that mutual capacitance generated between the sensing pad SP at the first column and the second row and the sensing pad SP at the first column and the first row can be reduced, and accuracy of the first sensing data is improved. In one embodiment, a first driving signal dr1 and a second driving signal dr2 are signals of a same phase and a same voltage.

Viewing from the second switch 394, a second terminal of the second switch 394 is provided with the second driving signal dr2, a control terminal of the second switch 394 is provided with the second control signal Ctr2, and the second control signal Ctr2 and the second driving signal dr2 have a same waveform change, so as to enable a difference between voltages of the second terminal and the control terminal of the second switch 394 to be a value. The conduction of the control terminal of the second switch 394 is not affected by a change of voltages for charging and discharging of the second driving signal dr2. More specifically, when the second control signal Ctr2 on the control terminal of the second switch 394 does not change with a change of the change of the voltage of the second driving signal dr2, the difference between the voltages of the control terminal and the second terminal of the second switch 394 fail to maintain at a value. At the period that the second driving signal dr2 charges the sensing pad SP, the difference between the voltages of the control terminal and the second terminal maintains at a value for conducting the second switch 394. However, at the non-charging period that the driving control circuit 37 determines the first sensing data of the sensing pad SP, the voltage level of the second driving signal dr2 decreases, the control terminal of the second switch 394 is subjected to capacitive coupling between the control terminal and the second terminal and therefore is pulled to a low voltage level, and consequently, a conduction capability of the second switch 394 is affected, and detection of the signal on the sensing pad SP by the driving control circuit 37 may be further affected, causing that the first sensing data cannot be accurately determined. In other words, when the second control signal Ctr2 on the control terminal of the second switch 394 changes with the change of the voltages for charging and discharging of the second driving signal dr2, the difference between the voltages of the control terminal and the second terminal of the second switch 394 maintains at the value, which ensures the conduction of the second switch 394, and prevents coupling capacitance from being generated between the control terminal and the second terminal of the second switch 394 and therefore further prevent noise from being generated at the connection line Tr.

On the other hand, the control terminal of the first switch 355 is not conducted according to the first control signal Ctr1 of the low voltage level. Although the first switch 355 is not conducted at the second time period P2, the first driving signal dr1 is still provided to the second terminal of the first switch 355. The same as the second switch 394, when the signal on the control terminal of the first switch 355 does not change with the signal on the second terminal, the control terminal of the first switch 355 is subjected to capacitive coupling between the control terminal and the second terminal, causing that the first switch 355 is conducted at the second time period P2. In other words, the signal on the control terminal of the first switch 355 changing with the signal on the second terminal may enable the first switch 355 to be not conducted at the second time period P2, and prevent capacitance from being generated between the control terminal and the second terminal and therefore prevent the capacitance from affecting the signal on the connection line Tr.

Subsequently, at the third time period P3, the driving control circuit 37 outputs, from the first control terminal 371, a first control signal Ctr1 of a high voltage level to the first selection terminal 351, and outputs, from the second control terminal 373, a second control signal Ctr2 of a low voltage level to the second selection terminal 391. The first switch 355 is conducted according to the first control signal Ctr1, and the second switch 394 is not conducted according to the second control signal Ctr2.

The first driving signal dr1 output by the first driving signal terminal 372 is provided to the sensing pad SP at the first column and the first row and the sensing pad SP at the first column and the second row through the first output terminal 353 and the first switch 355. The sensing pad SP at the first column and the first row and the sensing pad SP at the first column and the second row are intermittently charged according to the first driving signal dr1, and the driving control circuit 37 senses, at a non-charging period between two charging periods cha, signals on the sensing pad SP at the first column and the first row and the sensing pad SP at the first column and the second row and determines second sensing data according to the signals on the sensing pad SP at the first column and the first row and the sensing pad SP at the first column and the second row. In other words, in this embodiment, at the third time period P3, the first driving signal dr1 is provided to the first sensing pad groups 31 and the second sensing pad groups 33, and the second sensing data sensed by the driving control circuit 37 is associated with a touch behavior of the user on the first sensing pad groups 31 and the second sensing pad groups 33.

Viewing from the first switch 355, a second terminal of the first switch 355 is provided with the first driving signal dr1, a control terminal of the first switch 355 is provided with the first control signal Ctr1, and the first control signal Ctr1 and the first driving signal dr1 have a same waveform change, so as to enable a difference between voltages of the second terminal and the control terminal of the first switch 355 to be a value. The conduction of the control terminal of the first switch 355 is not affected by a change of voltages for charging and discharging of the first driving signal dr1. On the contrary, when the first control signal Ctr1 on the control terminal of the first switch 355 does not change with a change of the voltages for charging and discharging of the first driving signal dr1, the difference between the voltages of the control terminal and the second terminal of the first switch 355 fail to maintain at the value. At the period that the first driving signal dr1 charges the sensing pad SP, the difference between the voltages of the control terminal and the second terminal maintains at a value for conducting the first switch 355. However, at the non-charging period that the driving control circuit 37 determines the second sensing data of the sensing pad SP, the voltage level of the first driving signal dr1 decreases, the control terminal of the first switch 355 is subjected to capacitive coupling between the control terminal and the second terminal and therefore is pulled to a low voltage level, and consequently, a conduction capability of the first switch 355 is affected, and detection of the signal on the sensing pad SP by the driving control circuit 37 may be further affected, causing that the second sensing data cannot be accurately determined. In other words, when the first control signal Ctr1 on the control terminal of the first switch 355 changes with the change of the voltages for charging and discharging of the first driving signal dr1, the difference between the voltages of the control terminal and the second terminal of the first switch 355 maintains at the value, which ensures the conduction of the first switch 355, and prevents coupling capacitance from being generated between the control terminal and the second terminal of the first switch 355 and therefore further prevent noise from being generated at the connection line Tr.

On the other hand, the control terminal of the second switch 394 is not conducted according to the second control signal Ctr2 of the low voltage level. Although the second switch 394 is not conducted at the third time period P3, the second driving signal dr2 is still provided to the second terminal of the second switch 394. The same as the first switch 355, when the signal on the control terminal of the second switch 394 does not change with the signal on the second terminal, the control terminal of the second switch 394 is subjected to capacitive coupling between the control terminal and the second terminal, causing that the second switch 394 is conducted at the third time period P3. In other words, the signal on the control terminal of the second switch 394 changing with the signal on the second terminal may determine that the second switch 394 is not conducted at the third time period P3, and may prevent capacitance from being generated between the control terminal and the second terminal and therefore prevent the capacitance from affecting the signal on the connection line Tr.

In this embodiment, at the second time period P2, the driving control circuit 37 determines the first sensing data of the first sensing pad groups 31, and at the third time period P3, the driving control circuit 37 determines the second sensing data of the first sensing pad groups 31 and the second sensing pad groups 33. In one embodiment, a driving control circuit 37 determines third sensing data according to first sensing data and second sensing data, and determines a touch coordinate value by using the first sensing data and the third sensing data. Specifically, using a capacitance value as an example of sensing data, the first sensing data is a capacitance value of the first sensing pad groups 31. The second sensing data is a sum of capacitance values of the first sensing pad groups 31 and the second sensing pad groups 33. The driving control circuit 37 subtracts the first sensing data from the second sensing data, so as to obtain a capacitance value of the second sensing pad groups 33. The driving control circuit 37 determines a coordinate position of the touch panel 30 touched by a user according to the capacitance value of the first sensing pad groups 31 and the capacitance value of the second sensing pad groups 33. The driving control circuit 37 may determine sensing data of all the sensing pads SP, for example, voltage values or other appropriate information, which is not limited in this embodiment.

In one embodiment, a driving control circuit 37 may sequentially acquire a signal on a sensing pad SP from a first driving signal dr1 output from a first driving signal terminal 372. This embodiment does not limit that the driving control circuit 37 needs to synchronously output the first driving signal dr1 from all the first driving signal terminals 372. Besides, the driving control circuit 37 may coordinately output a second driving signal dr2 from a second driving signal terminal 372 according to the first driving signal terminal 374 that outputs the first driving signal dr1, which may be designed by a person of ordinary skill in the art according to actual requirements, and details are not described herein.

In the foregoing embodiment, the difference between the voltages of the control terminal and the second terminal of the first switch 355 may be not limited to be equal to the difference between the voltage of the control terminal and the second terminal of the second switch 394. When the difference between the voltages of the second terminal and the control terminal of each of the first switch 355 and the second switch 394 is a value, a difference between a voltage of the first selection terminal 351 and a voltage of each first input terminal 352 of the first selection module 35 is the value. A difference between a voltage of the second selection terminal 391 and a voltage of each second input terminal 392 of the second selection module 39 is the value. It should be understood by a person of ordinary skill in the art that the difference between the voltages being maintained at the value also includes a situation that the difference between the voltages includes a small change of the difference between the voltages above and below the value. In practice, a difference between voltages may change due to a factor of another element in the touch panel, a signal, or other factors, and therefore, it is difficult to maintain the difference between the voltages at a value, and the changes of the difference between the voltages shall fall within the scope of this embodiment.

In order to describe a sensing method of a touch panel more clearly, referring to FIG. 1 to FIG. 5, FIG. 5 is a flowchart of steps of a sensing method of a touch panel according to an embodiment of the present invention. As shown in the figures, when the sensing method of a touch panel is applied to the touch panel 10 shown in FIG. 1, in step s401, at a first time period, a first control signal is at least provided to the first selection terminal 151 to conduct the first sensing pad groups 11 and the first driving signal terminals 172, and the first sensing data of the first sensing pad groups 11 is determined. In other words, a signal of the first driving signal terminals is provided to the first sensing pad groups 11, so as to intermittently charge the first sensing pad groups 11, such that the driving control circuit 17 can determine the first sensing data of the first sensing pad groups 11 according to the signal on the first sensing pad groups 11.

In one embodiment, a driving control circuit provides a first control signal of a high voltage level to a first selection module, and also provides a second control signal of a lower voltage level to the first selection module, such that the first selection module sequentially conducts first sensing pad groups and first driving signal terminals according to the first control signal and the second control signal. In another embodiment, a driving control circuit may provide a first control signal of a low voltage level, so as to control first sensing pad groups and first driving signal terminals to be conducted.

In step s402, at a second time period, the first control signal is provided to the first selection signal terminals to at least conduct the second sensing pad groups and the first driving signal terminals, and second sensing data is determined. In other words, a signal of the first driving signal terminals 172 of the driving control circuit 17 is still provided to the second sensing pad groups 13, so as to intermittently charge the second sensing pad groups 13, such that the driving control circuit 17 can determine the second sensing data of the second sensing pad groups 13 according to the signal on the second sensing pad groups 13.

In one embodiment, a driving control circuit provides a first control signal of a low voltage level to a first selection module, and also provides a second control signal of a high voltage level to the first selection module, such that the first selection module sequentially conducts second sensing pad groups and first driving signal terminals according to the first control signal and the second control signal. In another embodiment, a driving control circuit may provide a first control signal of a high voltage level, so as to control second sensing pad groups and first driving signal terminals to be conducted. The sensing method of a touch panel of the present invention is essentially disclosed in the embodiments described above, and details are not described in this embodiment again.

To sum up, the embodiments of the present invention provides a touch panel and a sensing method thereof. In the touch panel, sensing pads are electrically connected to a driving control circuit by means of a first selection module, so as to reduce a quantity of contacts of the driving control circuit that are connected to sensing pads, thereby further reducing a size of the driving control circuit. Further, when the sensing pads are electrically connected to the driving control circuit by means of the first selection module, coupling capacitance is generated between a control terminal and an input terminal of the first selection module, causing that noise is generated at connection lines of the sensing pads. Therefore, in the embodiments of the present invention, by controlling a difference between voltages of the control terminal and the input terminal of the first selection module to maintain at a value, the coupling capacitance is prevented from being generated between the control terminal and the input terminal of the first selection module, and therefore, noise caused by the coupling capacitance is prevented from being generated at the connection lines.

Although the present invention is described above by means of the embodiments, the above description is not intended to limit the present invention. Variations and modifications made without departing from the spirit and scope of the present invention all fall within the scope of the present invention. Refer to the appended claims for the protection scope defined by the present invention.

What is claimed is:

1. A sensing method of a touch panel having a plurality of first sensing pad groups, a plurality of second sensing pad groups and a first selection module, wherein a plurality of sensing pads are defined in a plurality of rows in a sensing array to form the plurality of first sensing pad groups and the plurality of second sensing pad groups, each of the plurality of first sensing pad groups and each of the plurality of second sensing pad groups is respectively formed by one of the rows of sensing pads in the sensing array, and each of the plurality of first sensing pad groups and each of the plurality of second sensing pad groups are arranged in alternating rows in the sensing array, and wherein the first selection module has a first selection terminal, a plurality of first input terminals, a plurality of first output terminals and a plurality of second output terminals, each of the plurality of first output terminals is electrically connected to a corresponding one of the sensing pads in the plurality of first sensing pad groups, each of the plurality of second output terminals is electrically connected to a corresponding one of the sensing pads in the plurality of second sensing pad groups, and each of the plurality of first input terminals is electrically connected to one of a plurality of first driving signal terminals, the method comprising:

at a first time period, at least providing a first control signal to the first selection terminal to conduct the plurality of first sensing pad groups and the plurality of first driving signal terminals, and determining first sensing data of the plurality of first sensing pad groups, wherein a difference between a voltage of the first selection terminal and a voltage of each of the plurality of first input terminals is a first value; and at a second time period, providing the first control signal to the first selection signal terminal to at least conduct the plurality of second sensing pad groups and the plurality of first driving signal terminals, and determining second sensing data, wherein the second sensing data is at least associated with the plurality of second sensing pad groups, and a difference between a voltage of the first selection terminal and a voltage of each of the plurality of first input terminals is a second value.

2. The sensing method according to claim 1, wherein the touch panel further has a second selection module; the second selection module has a second selection terminal, a plurality of second input terminals, a plurality of third output terminals and a plurality of fourth output terminals; each of the plurality of third output terminals is electrically connected to a corresponding one of the sensing pads in the plurality of first sensing pad groups; each of the plurality of fourth output terminals is electrically connected to a corresponding one of the sensing pads in the plurality of second sensing pad groups; each of the plurality of second input terminals is electrically connected to one of a plurality of second driving signal terminals; and at the first time period, a second control signal is further provided to the second selection terminal to conduct the plurality of second sensing pad groups and the plurality of second driving signal terminals, wherein a difference between a voltage of the second selection terminal and a voltage of each of the plurality of second input terminals is the first value.

3. The sensing method according to claim 2, wherein the first selection module further has a plurality of first switches, a plurality of second switches and a third selection terminal; a first terminal of each of the plurality of first switches is electrically connected to a corresponding one of the sensing pads in the plurality of first sensing pad groups; a second terminal of each of the plurality of first switches is electrically connected to one of the plurality of first input terminals; a control terminal of each of the plurality of first switches is electrically connected to the first selection terminal; a first terminal of each of the plurality of second switches is electrically connected to a corresponding one of the sensing pads in the plurality of second sensing pad groups; a second terminal of each of the plurality of second switches is electrically connected to one of the plurality of first input terminals; a control terminal of each of the plurality of second switches is electrically connected to the third selection terminal; and at the first time period, a third control signal is further provided to the third selection terminal, such that each of the plurality of first switches is conducted according to the first control signal and each of the plurality of second switches is not conducted according to the third control signal, wherein a difference between a voltage of the third selection terminal and a voltage of each of the plurality of first driving signal terminals is a third value.

4. The sensing method according to claim 3, wherein the second selection module further has a plurality of third switches, a plurality of fourth switches, and a fourth selection terminal; a first terminal of each of the plurality of third switches is electrically connected to a corresponding one of the sensing pads in the plurality of first sensing pad groups; a second terminal of each of the plurality of third switches is electrically connected to one of the plurality of second input terminals; a control terminal of each of the plurality of third switches is electrically connected to the fourth selection terminal; a first terminal of each of the plurality of fourth switches is electrically connected to a corresponding one of the sensing pads in the plurality of second sensing pad groups; a second terminal of each of the plurality of fourth switches is electrically connected to the second input terminal; a control terminal of the fourth switch is electrically connected to the second selection terminal; and at the first time period, a fourth control signal is further provided to the fourth selection terminal, such that each of the plurality of third switches is not conducted according to the fourth control signal and each of the plurality of fourth switches is conducted according to the second control signal, wherein a difference between a voltage of the fourth selection terminal and a voltage of each of the plurality of second driving signal terminals is a fourth value.

5. The sensing method according to claim 4, wherein the first control signal and the second control signal are signals of a first control terminal, and the third control signal and the fourth control signal are signals of a second control terminal.

6. The sensing method according to claim 1, wherein the touch panel further has a second selection module; the second selection module has a second selection terminal, a plurality of second input terminals and a plurality of third output terminals; each of the plurality of third output terminals is electrically connected to a corresponding one of the sensing pads in the plurality of second sensing pad groups; each of the plurality of second input terminals is electrically connected to one of a plurality of second driving signal terminals; and at the first time period, a second control signal is further provided to the second selection terminal to conduct the plurality of second sensing pad groups and the plurality of second driving signal terminals, wherein a difference between a voltage of the second selection terminal and a voltage of each of the plurality of second input terminals is the first value.

7. The sensing method according to claim 6, wherein each of the plurality of first output terminals is electrically connected to one of the plurality of first input terminals; the first selection module further has a plurality of first switches; a first terminal of each of the plurality of first switches is electrically connected to a corresponding one of the sensing pads in the plurality of second sensing pad groups; a second terminal of each of the plurality of first switches is electrically connected to one of the plurality of first input terminals; a control terminal of each of the plurality of first switches is electrically connected to the first selection terminal; at the first time period, each of the plurality of first switches is not conducted according to the first control signal; at the second time period, each of the plurality of first switches is conducted according to the first control signal; and the second sensing data is further associated with the plurality of first sensing pad groups.

8. The sensing method according to claim 7, wherein the second selection module further has a plurality of second switches; a first terminal of each of the plurality of second switches is electrically connected to a corresponding one of the sensing pads in the plurality of second sensing pad groups; a second terminal of each of the plurality of second switches is electrically connected to one of the plurality of second input terminals; a control terminal of each of the plurality of second switches is electrically connected to the second selection terminal; at the first time period, each of the plurality of second switches is conducted according to the second control signal; and at the second time period, each of the plurality of second switches is not conducted according to the second control signal.

9. The sensing method according to claim 7, further comprising: determining third sensing data according to the first sensing data and the second sensing data, and determining a touch coordinate value by using the first sensing data and the third sensing data.

10. A touch panel, comprising:
a plurality of first sensing pad groups;
a plurality of second sensing pad groups, wherein a plurality of sensing pads are defined in a plurality of rows in a sensing array to form the plurality of first sensing pad groups and the plurality of second sensing pad groups, each of the plurality of first sensing pad groups and each of the plurality of second sensing pad groups is respectively formed by one of the rows of sensing pads in the sensing array, and each of the plurality of first sensing pad groups and each of the plurality of second sensing pad groups are arranged in alternating rows in the sensing array;
a first selection module, having a first selection terminal, a plurality of first input terminals, a plurality of first output terminals and a plurality of second output terminals, wherein each of the plurality of first output terminals is electrically connected to a corresponding one of the sensing pads in the plurality of first sensing pad groups, and each of the plurality of second output terminals is electrically connected to a corresponding one of the sensing pads in the plurality of second sensing pad groups; and
a driving control circuit, having a plurality of first driving signal terminals and a first control terminal, wherein each of the plurality of first driving signal terminals is electrically connected to one of the plurality of first input terminals; at a first time period, the driving control circuit at least provides a first control signal to the first selection terminal to conduct the plurality of first sensing pad groups and the plurality of first driving signal terminals, and first sensing data of the plurality of first sensing pad groups is determined, wherein a difference between a voltage of the first selection terminal and a voltage of each of the plurality of first input terminals is a first value; and at a second time period, the driving control circuit provides the first control signal to the first selection signal terminal to at least conduct the plurality of second sensing pad groups and the plurality of first driving signal terminals, and second sensing data is determined, wherein the second sensing data is at least associated with the plurality of second sensing pad groups, and a difference between a voltage of the first selection terminal and a voltage of each of the plurality of first input terminals is a second value.

11. The touch panel according to claim 10, wherein the touch panel further has a second selection module; the second selection module has a second selection terminal, a plurality of second input terminals, a plurality of third output terminals and a plurality of fourth output terminals; each of the plurality of third output terminals is electrically connected to a corresponding one of the sensing pads in the plurality of first sensing pad groups; each of the plurality of fourth output terminals is electrically connected to a corresponding one of the sensing pads in the plurality of second sensing pad groups; the driving control circuit further has a plurality of second driving signal terminals and a second control terminal; each of the plurality of second driving signal terminals is electrically connected to one of the plurality of second input terminals; the second control terminal is electrically connected to the second selection terminal; and at the first time period, the driving control circuit further provides a second control signal to the second selection terminal to conduct the plurality of second sensing pad groups and the second driving signal terminal, wherein a difference between a voltage of the second selection terminal and a voltage of each of the plurality of second input terminals is the first value.

12. The touch panel according to claim 11, wherein the first selection module further has a plurality of first switches, a plurality of second switches and a third selection terminal; a first terminal of each of the plurality of first switches is electrically connected to a corresponding one of the sensing pads in the plurality of first sensing pad groups; a second terminal of each of the plurality of first switches is electrically connected to one of the plurality of first input terminals; a control terminal of each of the plurality of first switches is electrically connected to the first selection terminal; a first terminal of each of the plurality of second switches is electrically connected to a corresponding one of the sensing pads in the plurality of second sensing pad groups; a second terminal of each of the plurality of second switches is electrically connected to one of the plurality of first input terminals; a control terminal of each of the plurality of second switches is electrically connected to the third selection terminal; and at the first time period, the driving control circuit further provides a third control signal to the third selection terminal to conduct the plurality of first switches according to the first control signal and to skip conducting the plurality of second switches according to the third control signal, wherein a difference between a voltage of the third selection terminal and a voltage of each of the plurality of first driving signal terminals is a third value.

13. The touch panel according to claim 12, wherein the second selection module further has a plurality of third switches, a plurality of fourth switches and a fourth selection terminal; a first terminal of each of the plurality of third switches is electrically connected to a corresponding one of the sensing pads in the plurality of first sensing pad groups; a second terminal of each of the plurality of third switches is electrically connected to one of the plurality of second input terminals; a control terminal of each of the plurality of third switches is electrically connected to the fourth selection terminal; a first terminal of each of the plurality of fourth switches is electrically connected to a corresponding one of the sensing pads in the plurality of second sensing pad groups; a second terminal of each of the plurality of fourth switches is electrically connected to one of the plurality of second input terminals; a control terminal of each of the plurality of fourth switches is electrically connected to the second selection terminal; and at the first time period, the driving control circuit further provides a fourth control signal to the fourth selection terminal to skip conducting the plurality of third switches according to the fourth control signal and to conduct the plurality of fourth switches according to the second control signal, wherein a difference between a voltage of the fourth selection terminal and a voltage of each of the plurality of second driving signal terminals is a fourth value.

14. The touch panel according to claim 13, wherein the first control signal and the second control signal are signals of the first control terminal, and the third control signal and the fourth control signal are signals of the second control terminal.

15. The touch panel according to claim 10, further comprising: a second selection module, wherein the second selection module has a second selection terminal, a plurality of second input terminals, and a plurality of third output terminals; each of the plurality of third output terminals is electrically connected to a corresponding one of the sensing pads in the plurality of second sensing pad groups; each of the plurality of second input terminals is electrically connected to one of a plurality of second driving signal terminals; and at the first time period, a second control signal is further provided to the second selection terminal to conduct the plurality of second sensing pad groups and the plurality of second driving signal terminals, wherein a difference between a voltage of the second selection terminal and a voltage of each of the plurality of second input terminals is the first value.

16. The touch panel according to claim 15, wherein each of the plurality of first output terminals is electrically connected to one of the plurality of first input terminals; the first selection module further has a plurality of first switches; a first terminal of each of the plurality of first switches is electrically connected to a corresponding one of the sensing pads in the plurality of second sensing pad groups; a second terminal of each of the plurality of first switches is electrically connected to one of the plurality of first input terminals; a control terminal of each of the plurality of first switches is electrically connected to the first selection terminal; at the first time period, each of the plurality of first switches is not conducted according to the first control signal; at the second time period, each of the plurality of first switches is conducted according to the first control signal; and the second sensing data is further associated with the plurality of first sensing pad groups.

17. The touch panel according to claim 16, wherein the second selection module further has a plurality of second switches; a first terminal of each of the plurality of second switches is electrically connected to a corresponding one of the sensing pads in the plurality of second sensing pad groups; a second terminal of each of the plurality of second switches is electrically connected to one of the plurality of second input terminals; a control terminal of each of the plurality of second switches is electrically connected to the second selection terminal; at the first time period, each of the plurality of second switches is conducted according to the second control signal; and at the second time period, each of the plurality of second switches is not conducted according to the second control signal.

18. The touch panel according to claim 17, wherein the driving control circuit determines third sensing data according to the first sensing data and the second sensing data, and determines a touch coordinate value by using the first sensing data and the third sensing data.

* * * * *